United States Patent
Rosenbaum et al.

(10) Patent No.: US 6,890,972 B2
(45) Date of Patent: May 10, 2005

(54) ERASABLE INK FOR A WRITING IMPLEMENT

(75) Inventors: Barry Rosenbaum, West Bloomfield, MI (US); Frances Fesuk, Rowland Heights, CA (US)

(73) Assignee: Advance Watch Company, Ltd., Warren, MI (US)

( * ) Notice: Subject to any disclaimer, the term of this patent is extended or adjusted under 35 U.S.C. 154(b) by 146 days.

(21) Appl. No.: 10/339,485

(22) Filed: Jan. 9, 2003

(65) Prior Publication Data

US 2004/0138334 A1 Jul. 15, 2004

(51) Int. Cl.$^7$ .......................... C09D 11/16; C08L 25/08
(52) U.S. Cl. ...................... 523/161; 524/577
(58) Field of Search ................................ 523/160, 161; 106/31.6, 31.64, 31.85; 524/577

(56) References Cited

U.S. PATENT DOCUMENTS

| | | | |
|---|---|---|---|
| 3,949,132 A | | 4/1976 | Seregely et al. |
| 4,097,290 A | | 6/1978 | Muller et al. |
| 4,329,262 A | | 5/1982 | Muller |
| 4,349,639 A | | 9/1982 | Muller |
| 4,357,431 A | | 11/1982 | Murakami et al. |
| 4,367,966 A | * | 1/1983 | Williams et al. ............ 401/190 |
| 4,379,867 A | | 4/1983 | Noriaki |
| 4,389,499 A | | 6/1983 | Riesgraf |
| 4,390,646 A | | 6/1983 | Ferguson |
| 4,391,927 A | | 7/1983 | Farmer, III |
| 4,629,748 A | | 12/1986 | Miyajima et al. |
| 4,687,791 A | | 8/1987 | Miyajima et al. |
| 4,721,739 A | | 1/1988 | Brenneman et al. |
| 4,738,725 A | | 4/1988 | Daugherty et al. |
| 5,135,569 A | * | 8/1992 | Mathias ................... 106/31.32 |
| 5,362,167 A | | 11/1994 | Loftin |
| 5,599,853 A | | 2/1997 | Loftin |
| 5,919,858 A | | 7/1999 | Loftin |
| 5,977,211 A | | 11/1999 | Koyama |
| 6,075,070 A | | 6/2000 | Lin et al. |

FOREIGN PATENT DOCUMENTS

EP        110161 A1  *  6/1984

* cited by examiner

*Primary Examiner*—Callie Shosho
(74) *Attorney, Agent, or Firm*—Brooks Kushman P.C.

(57) ABSTRACT

At least one embodiment of the present invention relates to an erasable ink composition particularly useful in a writing instrument for simultaneous the appearance of a graphite pencil. The composition of the present invention comprises a solvent system, a rubber and a pigment. The solvent system used in the present invention comprises an organic ester and a component selected from the group consisting of an optionally substituted cycloalkane, an optionally substituted cycloalkanone, an optionally substituted cycloalkene, or mixtures thereof. A sufficient amount of the solvent system is present so that the erasable ink composition will flow in a writing instrument. Finally, the erasable ink composition optionally includes a plasticizer, a liquid butene, or one or more additives selected from the group consisting of a corrosion inhibitor, a flow enhancing compound, and mixtures thereof.

42 Claims, No Drawings

ERASABLE INK FOR A WRITING IMPLEMENT

BACKGROUND OF THE INVENTION

1. Field of the Invention

In at least one aspect, the present invention is related to erasable ink compositions that substantially simulate the appearance of a graphite pencil, and more particularly to erasable ink compositions that substantially simulate the appearance of a graphite pencil and are suitable for use in replaceable cartridges.

2. Background Art

For a number of years, there has been a desire to produce a pen that produces an erasable, pencil-like trace. Although a number of erasable ink compositions are known, attempts to make erasable ink compositions that substantially simulate the trace of a pencil have been plagued by difficulties related to the poor quality of the trace produced and to poor erasability. Notwithstanding the problems associated with the pencil-simulating compositions, ink compositions that are erasable with a typical pencil eraser are known. Generally, such compositions maintain erasablity for at least several hours.

The erasable ink prior art includes erasable ink compositions that are both water-based and non-water based. The non-water based erasable ink formulations minimally contain a rubber, a pigment, and at least one solvent. For example, U.S. Pat. Nos. 4,390,646 and 4,389,499, each disclose an erasable ink composition which includes a thermoplastic block copolymer, pigments, and a solvent. Preferably the copolymers are a mixture of radial and linear block copolymers. Similarly, U.S. Pat. No. 4,721,739 (the '739 patent) discloses an erasable ink composition that contains a block polymer, a plasticizer, a lubricant, a colorant (i.e., a pigment), and a resin. Suitable plasiticizers as set forth in the '739 patent are aliphatic esters such as butyl stearate and dioctyl adipate; or aromatic esters such as dioctyl phthalate. These esters have a moderate molecular weight that is greater than 250.

The particular choice of pigments is important in maintaining the erasability of traces formed by the erasable ink composition. Moreover, the selection of an appropriate rubber (block polymer) dissolved in a solvent is such that when the solvent evaporates the ink viscosity increases to the point where further penetration of the ink to the paper is minimized. Unfortunately, these compositions are often plagued by clogging of the writing implement (i.e., the pen) over extended periods of time of non-use. This phenomenon tends to be somewhat worse when the ink is exposed to a humid environment. Accordingly, U.S. Pat. No. 4,629,748 (the '748 patent) provides at least a partial solution to this problem by disclosing the utility of various dispersants in erasable ink compositions which contain rubber and non-aqueous solvents. Specifically, the '748 demonstrates the use of alkyl phosphate ester, amines, and oxyethylene-oxypropylene block copolymers.

Similarly, numerous water-based erasable ink compositions exist in the prior art. Typically, such aqueous compositions include a block copolymer such as styrene-butadiene and a pigment. Generally such compositions also include one or more additives such as releasing and spreading agents, antioxidants, surfactants, gelatinizers, lubricants, and various waxes.

Although many of the various prior art erasable ink compositions generally work to some degree, there is still a need for an improved erasable ink composition that produces tracings that substantially mimic the tracings of a pencil without substantially clogging the writing implement and without substantial breaks in the formed tracings. Moreover, there is also a need for a formulation that is capable of producing tracings that are for erasable for one or more days instead of the few hours which is typical of the prior art formulations.

SUMMARY OF THE INVENTION

The present invention overcomes at least one of the problems encountered in the prior art by providing an improved erasable ink composition particularly useful in a writing instrument that produces tracings substantially similar in appearance to tracings formed by a graphite pencil. Moreover, the composition of the present invention produces tracings that are substantially erasable with a common rubber pencil erasable for at least one day after the tracings are formed on paper. In at least one embodiment, the composition of the present invention comprises a solvent system, a rubber, and a pigment. The solvent system used in the present invention includes an organic ester and a component selected from the group consisting of an optionally substituted cycloalkane, an optionally substituted cycloalkanone, an optionally substituted cycloalkene, or mixtures thereof. The composition contains a sufficient amount of the solvent system so that the erasable ink composition will flow in a writing instrument. Finally, the erasable ink composition of the present invention optionally include one or more of the following:

a plasticizer an additive selected from the group consisting of a corrosion inhibitor, a flow enhancing compound, and mixtures thereof; and a liquid butene polymer.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counter-ions to produce electrical neutrality for the composition as a whole (any counter-ions thus implicitly specified should preferably be selected from among other constituents explicitly specified in ionic form, to the extent possible; otherwise such counter-ions may be freely selected, except for avoiding counter-ions that act adversely to the objects of the invention); and the term "mole" and its variations may be applied to elemental, ionic, and any other chemical species defined by number and type of atoms present, as well as to compounds with well defined molecules.

The term "cycloalkane" as used herein refers to cyclic saturated hydrocarbons having a ring of carbon atoms. A cycloalkane may be substituted with one or more substituents (i.e., optionally substituted.) Suitable substituents include, but are not limited to, lower alkyl, lower alkoxy, lower thioalkoxy, hydroxy, lower alkyl amino, amino, and nitro.

The term "cycloalkene" as used herein refers to cyclic hydrocarbons having a ring of carbon atoms with one or more double bonds. A cycloalkene may be substituted with one or more substituents (i.e., optionally substituted.) Suitable substituents include, but are not limited to, lower alkyl, lower alkoxy, lower thioalkoxy, hydroxy, lower alkyl amino, amino, and nitro.

The term "cycloalkanone" as used herein refers to cyclic saturated hydrocarbons having a ring of carbon atoms where at least one of the carbon atoms of the ring is doubly bonded to oxygen. A cycloalkanone may be substituted with one or more substituents (i.e., optionally substituted.) Suitable substituents include, but are not limited to, lower alkyl, lower alkoxy, lower thioalkoxy, hydroxy, lower alkyl amino, amino, and nitro.

The term "lower alkyl" as used herein refers to a branched or straight hydrocarbon radical having from 1 to 6 carbon atoms and includes for example, methyl, ethyl, n-propyl, isopropyl, n-butyl, isobutyl, sec-butyl, tert-butyl, and the like.

The term "lower alkoxy" as used herein refers to O-alkyl of from 1 to 6 carbon atoms as defined above for "lower alkyl."

The term "thioalkoxy" as used herein refers to S-alkyl of from 1 to 6 carbon atoms as defined above for "lower alkyl."

The term "halogen" as used herein refers to fluorine, chlorine, bromine, or iodine.

The term "organic ester" as used herein refers to organic compounds formed by the reaction of a carboxylic acid and an alcohol.

The term "phosphate ester" as used herein refers to compounds formed by the reaction of phosphoric acid ($H_3PO_4$) and an alcohol. Included in this definition are compounds formed by the replacement of one, two, or three hydroxyl groups in phosphoric by alkoxyl.

The term "phthalic ester" as used herein means an ester of phthalic acid. Phthalic esters are often made by reacting phthalic anhydride with an alcohol in the presence of sulfuric acid.

In an embodiment of the present invention, an erasable ink composition is provided. The erasable ink composition comprises:
- a solvent system including:
  - a component selected from the group consisting of an optionally substituted cycloalkane, an optionally substituted cycloalkene, an optionally substituted cycloalkanone, and mixtures thereof; and
  - an organic ester;
- rubber; and
- a pigment;

wherein a sufficient amount of the solvent system is added so that the erasable ink composition will flow in a writing implement. Typically, the erasable ink composition of the present invention will be provided in a reusable cartridge with the ink under a pressure from 25 psi to 35 psi. The solvent system is present in a sufficient amount so that the erasable ink composition has a viscosity from 20,000 cP to 60,000 cP at 25° C. More preferably, the solvent system is present in a sufficient amount that the erasable ink composition has a viscosity from 30,000 cP to 50,000 cP at 25° C.; and most preferably the solvent system is present in a sufficient amount that the erasable ink composition has a viscosity of 40,000 cP at 25° C. The compositions of the present invention produces tracings that are substantially erasable with a common rubber pencil erasable for at least one day after the tracings are formed on paper. Moreover, the compositions of the present invention produces tracings that are substantially erasable with a common rubber pencil erasable for a week or longer after the tracings are formed on paper.

The erasable ink composition of the present invention optionally include one or more of the following:
- a plasticizer
- an additive selected from the group consisting of a corrosion inhibitor, a flow enhancing compound, and mixtures thereof; and
- a liquid butene polymer.

Many of the improved features of the present invention are attributable to the selection of the solvent system. The solvent system comprises a cyclic component selected from the group consisting of an optionally substituted cycloalkane, an optionally substituted cycloalkanone, and mixtures thereof; and an organic ester. In certain embodiments, the cyclic component is selected from the group consisting of optionally substituted cycloalkane having a 4 to 7 member ring, an optionally substituted cycloalkanone having a 4 to 7 member ring, an optionally substituted cycloalkene having a 4 to 7 member ring, and mixtures thereof. In other embodiments, the cyclic component is selected from the group consisting of cyclohexane, cyclohexanone, and mixtures thereof; and in certain preferred embodiments the cyclic component is cyclohexane. In certain embodiments, the organic ester is a low molecular weight organic ester with a molecular weight that is less than 250. In other embodiments, the organic ester has a molecular weight less than 200. In certain preferred embodiments, the organic ester is isobutyl butyrate.

As set forth above, in certain embodiments, the solvent system is present in a sufficient amount such that the erasable ink composition has a viscosity from 20,000 cP to 60,000 cP at 25° C. Viscosity values in this range are typically obtained when the solvent system is present in an amount of 25% to 55% of the total weight of the erasable ink composition. More preferably, the solvent system is present in an amount of 35% to 45% of the total weight of the erasable ink composition; and most preferably, the solvent system is present in an amount of 40% of the total weight of the erasable ink composition. All percentages of the erasable ink composition as expressed in this document, unless otherwise stated, refer to the weight percentage of the stated component relative to the total weight of the erasable ink composition at standard temperature and pressure. The preferred solvent system comprises cyclohexane and isobutyl butyrate. In this variation, the cyclohexane is preferably present in an amount of 40% to 70% of the total weight of the solvent system, and the isobutyl butyrate is preferably present in an amount of 30% to 60% of the total weight of the solvent system. More preferably, the cyclohexane is present in an amount of 45% to 65% of the total weight of the solvent system, and the isobutyl butyrate is present in an amount of about 35% to 55% of the total weight of the solvent system; and most preferably, the cyclohexane present in an amount of 55% of the total weight of the solvent system; and isobutyl butyrate is present in an amount of 45% of the total weight of the solvent system.

The composition of the present invention further comprises rubber. Both synthetic and natural rubber and mixtures thereof are suitably included. In certain embodiments, the rubbers are natural or synthetic rubbers that are copolymers of styrene and isoprene. Accordingly, these copolymer may be block copolymers, random copolymers, graft copolymers, or mixtures thereof. Preferably, the rubber is a block copolymer and more preferably, a block copolymer of styrene and isoprene. The rubber is preferably present in an amount of 10% to 40% of the total weight of the erasable ink composition. More preferably, the rubber is present in an amount of 15% to 25% of the total weight of the erasable ink composition; and most preferably the rubber is present in an amount of 20% of the total weight of the erasable ink composition. A particularly preferred rubber is Kraton™ D-1107 which is a styrene-isoprene-styrene block copolymer that includes an antioxidant, a stabilizer, and dusting agents. Kraton™ D-1107 is commercially available from Kraton Polymers located in Houston Tex.

The erasable ink of the present invention also includes a pigment. In certain embodiments, the pigment is a powder pigment wherein the powder particles have an mean particle diameter of 0.05 to 4 microns. In other embodiments, the pigment particles have a mean diameter of 0.5 to 3 microns; and in certain preferred embodiments the pigment particles have a mean diameter of 2 microns. Particularly useful powdered pigments comprise graphite powder, carbon black, and mixtures thereof. In certain embodiments, the powdered pigment is present in an amount of 2% to 25% of the total weight of the erasable ink composition. More preferably, the powdered pigment is present in an amount of 5% to 20% of the total weight of the erasable ink composition; and most preferably the powdered pigment is present in an amount of 12% of the total weight of the erasable ink composition. Particularly preferred pigments include graphite and carbon black. A particularly preferred pigment is synthetic graphite grade 48927 commercially available from Asbury Graphite mills located in Asbury N.J.

The erasable ink composition of the present invention also optionally includes a liquid butene polymer and a plasticizer. Suitable butene polymers include, but are not necessarily limited to, polybutene or copolymers of butene and isobutene. The plasticizer is preferably at least one phthalic ester. Preferred phthalic esters comprise dibutyl phthalate, dioctyl phthalate, and mixtures thereof.

In certain embodiments, the plasticizer is present in an amount of 5% to 25% of the total weight of the erasable ink composition. In other embodiments, the plasticizer is present in an amount of 10% to 20% of the total weight of the erasable ink composition; and in certain preferred embodiments, the at least one phthalic ester is present in an amount of 16% of the total weight of the erasable ink composition. In a particularly preferred embodiment of the present invention, the at least one phthalic ester is a phthalic ester mixture comprising dibutyl phthalate in an amount of 10% to 40% of the total weight of the phthalic ester mixture; and dioctyl phthalate in an amount of 60% to 90% of the total weight of the phthalic ester mixture.

The erasable ink composition of the present invention also optionally comprises an additive selected from the group consisting of a corrosion inhibitor, dispersants, a flow enhancing material, lubricants, resins, and mixtures thereof. Preferred corrosion inhibitors, include but are not necessarily limited to phosphate esters, and in particular to alkyl phosphate esters. A suitable phosphate ester is Rhodafac RS-410 commercially available from Rhodia HPCII. The corrosion inhibitor helps protect the metal components in the writing instrument (i.e., the pen) from the corrosive activity of the erasable ink composition. Moreover, phosphate ester may also improve dispersion of the ink over extended periods of time. The phosphate ester is present in an amount of 0.5% to 6% of the total weight of the erasable ink composition. More preferably, the corrosion inhibitor is present in an amount of 1% to 5% of the total weight of the erasable ink composition; and most preferably the corrosion inhibitor is present in an amount of 3% of the total weight of the erasable ink composition.

Although not limiting the practice of the invention to any particular mechanism of operation, the flow enhancing materials, the lubricant, and the resins function at least to some degree by allowing the viscosity of the erasable composition to be adjusted within the limits as set forth above. Preferred flow enhancing materials include mineral oil and glycerin. Suitable mineral oils include, but are not limited to, the Drakol™ line of mineral oils available from Pennzoil. Preferably, the flow enhancing materials are present in an amount of 0.5% to 6% of the total weight of the erasable ink composition. More preferably, the flow enhancing material is present in an amount of 1% to 5% of the total weight of the erasable ink composition; and most preferably, the flow enhancing material is present in an amount of 3% of the total weight of the erasable ink composition. The composition of the present invention may also include one or more lubricants. If present, the lubricants are preferably present in an amount from 0.5% to 10% of the total weight of the erasable ink composition. More preferably, the lubricants are present in an amount from 1% to 5% of the total weight of the erasable ink composition; and most preferably, the lubricants are present in an amount of 2% of the total weight of the erasable ink composition. A particularly preferred lubricant is Penetek™ commercially available from JMN Specialties, Inc. located in Westwego, La.

The erasable ink composition of the present invention may also include an additive which is a resin. Such resins when used are preferably present in an amount from 0.1% to 3% of the total weight of the erasable ink composition. More preferably, such resins are present in an amount from 0.2% to 1% of the total weight of the erasable ink composition. A preferred resin is polyvinylpyrrolidone such as PVPK-30™ which is commercially available from BASF Corporation located in Wyandotte, Mich.

The following non-limiting examples illustrate the various embodiments of the present invention. Those skilled in the art will recognize many variations that are within the spirit of the present invention and scope of the claims.

EXAMPLE 1

The composition illustrated in Table 1 is prepared by mixing the components together.

TABLE 1

Weight percentages of erasable ink composition

| Component | Weight % |
|---|---|
| cyclohexane | 22 |
| isobutyl isobutyrate | 18 |
| Kraton Polymer D-1107 | 20 |
| Dibutyl Phthalate | 12 |
| Dioctyl Phthalate | 4 |
| Rhodafac RS-410 | 3 |
| Drakol Oil | 3 |
| Polybutene | 6 |
| Graphite (Grade 4827) | 12 |

EXAMPLE 2

The composition illustrated in Table 2 is prepared by mixing the components together. The premix is made in advance by combining 95 weight percent glycerin and 5 weight percent PVPK-30 prior to combining with the other ingredients.

TABLE 2

Weight percentages of erasable ink composition

| Component | Weight % |
|---|---|
| cyclohexane | 18 |
| isobutyl isobutyrate | 13 |
| Kraton Polymer D-1107 | 18 |
| Dibutyl Phthalate | 5 |
| Rhodafac RS-410 | 4 |
| Drakol Oil | 2 |
| Polybutene | 9 |
| Glycerin | 10 |
| Premix of 95 weight percent glycerin and 5 weight percent PVPK-30 | 5 |
| Penetek | 2 |
| Graphite (Grade 4827) | 14 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An erasable ink composition comprising:
   a solvent system including:
   a component selected from the group consisting of cyclohexane, cyclohexanone, and mixtures thereof and isobutyl butyrate;
   a rubber; and
   a pigment;
   the solvent system present in a sufficient amount that the erasable ink composition will flow in a writing implement.

2. The erasable ink composition of claim 1 wherein a sufficient amount of the solvent system is present so that the erasable ink composition has a viscosity from 20,000 cP to 60,000 cP at 25° C.

3. The erasable ink composition of claim 1 wherein a sufficient amount of the solvent system is present so that the erasable ink composition has a viscosity from 30,000 cP to 50,000 cP at 25° C.

4. The erasable ink composition of claim 1 wherein the solvent system is present in an amount of 25% to 55% of the total weight of the erasable ink composition.

5. The erasable ink composition of claim 1 wherein the solvent system is present in an amount of 35% to 45% of the total weight of the erasable ink composition.

6. The erasable ink composition of claim 1 wherein the solvent system is present in an amount of 40% of the total weight of the erasable ink composition.

7. The erasable ink composition of claim 1 wherein the solvent system includes:
   cyclohexane present in an amount of 40% to 70% of the total weight of the solvent system; and
   isobutyl butyrate present in an amount of 30% to 60% of the total weight of the solvent system.

8. The erasable ink composition of claim 1 wherein the solvent system includes:
   cyclohexane present in an amount of 45% to 65% of the total weight of the solvent system; and
   isobutyl butyrate present in an amount of 35% to 55% of the total weight of the solvent system.

9. The erasable ink composition of claim 1 wherein the solvent system includes:
   cyclohexane present in an amount of 55% of the total weight of the solvent system; and
   isobutyl butyrate present in an amount of 45% of the total weight of the solvent system.

10. The erasable ink composition of claim 1 wherein the rubber is a natural or synthetic rubber.

11. The erasable ink composition of claim 10 wherein the rubber is a synthetic rubber which is a copolymer of styrene and isoprene.

12. The erasable ink composition of claim 10 wherein the natural or synthetic rubber is a present in an amount of 10% to 40% of the total weight of the erasable ink composition.

13. The erasable ink composition of claim 1 wherein the rubber is a present in an amount of 15% to 25% of the total weight of the erasable ink composition.

14. The erasable ink composition of claim 1 wherein the rubber is a present in an amount of 20% of the total weight of the erasable ink composition.

15. The erasable ink composition of claim 1 wherein the pigment is graphite powder, carbon black powder, or mixture thereof.

16. The erasable ink composition of claim 1 wherein the pigment is present in an amount of 2% to 25% of the total weight of the erasable ink composition.

17. The erasable ink composition of claim 1 wherein the pigment is present in an amount of 5% to 20% of the total weight of the erasable ink composition.

18. The erasable ink composition of claim 1 wherein the pigment is present in an amount of 12% of the total weight of the erasable ink composition.

19. The erasable ink composition of claim 1 further comprising a component selected from the group consisting of:
   a plasticizer;
   an additive selected from the group consisting of a corrosion inhibitor, a flow enhancing compound, and mixtures thereof;
   a liquid butene polymer; and
   mixtures thereof.

20. The erasable ink composition of claim 19 wherein the additive comprise a corrosion inhibitor.

21. The erasable ink composition of claim 20 wherein the corrosion inhibitor comprises a phosphate ester present in an amount of 0.5% to 6% of the total weight of the erasable ink composition.

22. The erasable ink composition of claim 20 wherein the corrosion inhibitor is present in an amount of 1% to 5% of the total weight of the erasable ink composition.

23. The erasable ink composition of claim 20 wherein the corrosion inhibitor is present in an amount of 3% of the total weight of the erasable ink composition.

24. The erasable ink composition of claim 19 wherein the additive comprises a flow enhancing material.

25. The erasable ink composition of claim 24 wherein the flow enhancing material is a mineral oil present in an amount of 0.5% to 6% of the total weight of the erasable ink composition.

26. The erasable ink composition of claim 24 wherein the flow enhancing material is a mineral oil present in an amount of 1% to 5% of the total weight of the erasable ink composition.

27. The erasable ink composition of claim 24 wherein the flow enhancing material is a mineral oil present in an amount of 3% of the total weight of the erasable ink composition.

28. The erasable ink composition of claim 19 wherein the liquid butene polymer comprises a component selected from the group consisting of polybutene, a copolymer of butene and isobutene, and mixtures thereof.

29. The erasable ink composition of claim 19 wherein the plasticizer is at least one phthalic ester selected from the group consisting a dibutyl phthalate, dioctyl phthalate, and mixtures thereof.

30. The erasable ink composition of claim 29 wherein the at least one phthalic ester is present in an amount of 5% to 25% of the total weight of the erasable ink composition.

31. The erasable ink composition of claim 29 wherein the at least one phthalic ester is present in an amount of 10% to 20% of the total weight of the erasable ink composition.

32. The erasable ink composition of claim 29 wherein the at least one phthalic ester is present in an amount of 16% of the total weight of the erasable ink composition.

33. The erasable ink composition of claim 29 wherein the at least one phthalic ester is a phthalic ester mixture comprising:

dibutyl phthalate in an amount of 10% to 40% of the total weight of the phthalic ester mixture; and dioctyl phthalate in an amount of 60% to 90% of the total weight of the phthalic ester mixture.

34. An erasable ink composition comprising:

a solvent system including:

a component selected from the group consisting of cyclohexane, cyclohexanone, and mixtures thereof and isobutyl butyrate;

at least one phthalic ester selected from the group consisting of a dibutyl phthalate, dioctyl phthalate, and mixtures thereof;

a rubber;

an additive selected from the group consisting of a corrosion inhibitor, a flow enhancing compound, and mixtures thereof;

a liquid butene polymer; and a pigment;

the solvent system present in a sufficient amount that the erasable ink composition will flow in a writing implement and the erasable ink composition has a viscosity from 20,000 cP to 60,000 cP at 25° C.

35. The erasable ink composition of claim 34 wherein the solvent system comprises a component selected from the group consisting of an optionally substituted cycloalkane having a 4 to 7 member ring, an optionally substituted cycloalkanone having a 4 to 7 member ring, an optionally substituted cycloalkene having a 4 to 7 member ring, and mixtures thereof; and an organic ester.

36. The erasable ink composition of claim 34 wherein the solvent system is present in an amount of 25% to 55% of the total weight of the erasable ink composition.

37. The erasable ink composition of claim 34 wherein the pigment is graphite powder, carbon black powder, or mixture thereof.

38. An erasable ink composition comprising:

a solvent system including:

cyclohexane present in an amount of 55% of the total weight of the solvent system and isobutyl butyrate present in an amount of 45% of the total weight of the solvent system;

at least one phthalic ester selected from the group consisting a dibutyl phthalate, dioctyl phthalate, and mixtures thereof;

a rubber;

an additive selected from the group consisting of a corrosion inhibitor, a flow enhancing compound, and mixtures thereof;

a liquid butene polymer; and a pigment;

the solvent system present in a sufficient amount that the erasable ink composition will flow in a writing implement and the erasable ink composition has a viscosity from 20,000 cP to 60,000 cP at 25° C.

39. The erasable ink composition of claim 38 wherein the solvent system is present in an amount of 25% to 55% of the total weight of the erasable ink composition.

40. The erasable ink composition of claim 38 wherein the pigment is graphite powder, carbon black powder, or mixture thereof.

41. The erasable ink composition of claim 38 wherein the at least one phthalic ester is present in an amount of 5% to 25% of the total weight of the erasable ink composition.

42. The erasable ink composition of claim 38 wherein the at least one phthalic ester is a phthalic ester mixture comprising:

dibutyl phthalate in an amount of 10% to 40% of the total weight of the phthalic ester mixture; and dioctyl phthalate in an amount of 60% to 90% of the total weight of the phthalic ester mixture.

* * * * *